Aug. 26, 1958  G. L. HALL ET AL  2,849,675
APPARATUS FOR DETERMINING AND EVALUATING
IRREGULARITIES IN PNEUMATIC TIRES
Filed Jan. 8, 1954  3 Sheets-Sheet 1

INVENTORS
GEORGE L. HALL
FLOYD S. CONANT
BY
W. A. Fraser
ATTORNEY

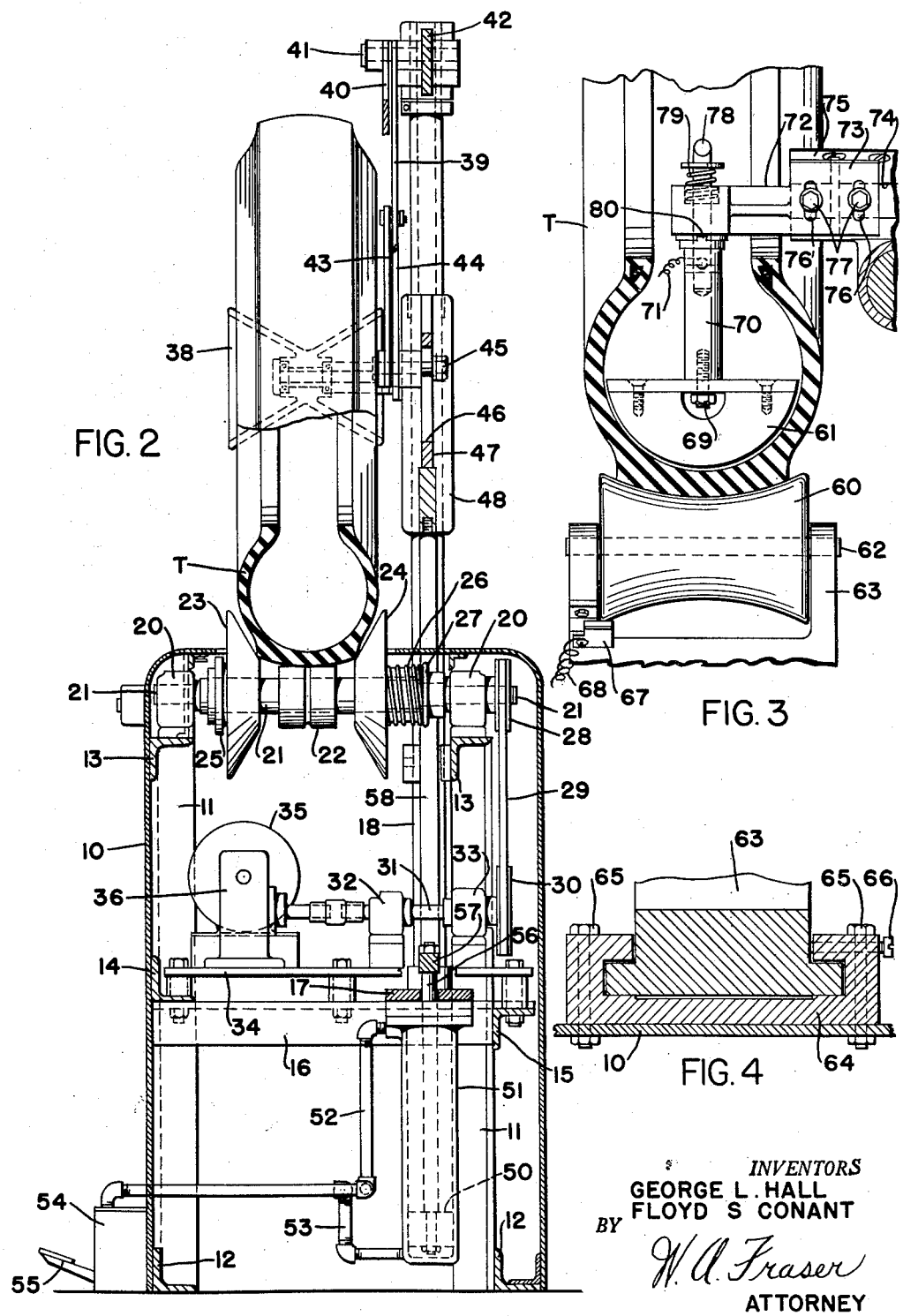

Aug. 26, 1958

G. L. HALL ET AL 2,849,675

APPARATUS FOR DETERMINING AND EVALUATING
IRREGULARITIES IN PNEUMATIC TIRES

Filed Jan. 8, 1954

INVENTORS
GEORGE L. HALL
FLOYD S. CONANT
BY

*W. A. Fraser*

ATTORNEY

United States Patent Office 2,849,675
Patented Aug. 26, 1958

2,849,675

APPARATUS FOR DETERMINING AND EVALUATING IRREGULARITIES IN PNEUMATIC TIRES

George L. Hall and Floyd S. Conant, Akron, Ohio, assignors to The Firestone Tire & Rubber Company, Akron, Ohio, a corporation of Ohio Application January 8, 1954, Serial No. 403,002

6 Claims. (Cl. 324—61)

The invention relates generally to the detection of normally non-visible irregularities in the distribution of mass or density of a cured pneumatic tire casing, and more particularly to a non-destructive method and apparatus for determining non-uniformity in mass, thickness and quality or nature of the tire casing.

Non-uniform distribution of mass in a tire casing results in dynamic unbalance and may cause tire "thump" in use, as well as irregular wear of the tire. Slight, relatively unnoticeable variations in mass, thickness or quality may also cause uneven wear and unbalance, even though an audible thump may not be produced. Prior methods of testing tire casings for non-uniformity have involved statically or dynamically balancing the tire with conventional balancing devices which are inaccurate as well as inadequate, because they do not necessarily disclose small variations in uniformity of mass, thickness or quality.

Testing tires on dynamic balancing devices enables some correction of the mass distribution of the wheel and tire system, but not to a sufficient degree to substantially eliminate tire thump in operation; moreover, such correction does not eliminate improper wear due to irregularities in mass, or variations in thickness or quality.

Other methods of determining non-uniformity involve physical testing to destruction of a specimen tire or sections thereof, but this gives no accurate knowledge of the condition of other tires in the same run which are not so tested.

It is an object of the present invention to provide a novel method and apparatus for rapidly and accurately testing pneumatic tires for substantially all irregularities in mass, thickness and quality.

Another object is to provide for determining irregularities in a tire casing without physically distorting or destroying the tire.

Another object is to provide a novel method which enables accurately testing all tires in a production run for uniformity without marring or otherwise affecting the tires in any way.

A further object is to provide a novel apparatus for quickly and accurately testing tires for uniformity.

A still further object is to provide a novel and inexpensive apparatus for testing tires for uniformity, which apparatus is adapted for testing tires of a wide variety of sizes.

These and other objects are accomplished by the novel method and apparatus comprising the present invention, a preferred embodiment of which is shown by way of example in the accompanying drawings and described in detail herein, the scope of the invention being defined in the appended claims. Various modifications and changes in details of construction are comprehened within the scope of the claims.

In general terms, the invention includes rotating the tread portion of a tire between two electrodes to form a tuning condenser which is connected to a radio-frequency oscillator circuit and utilizing a rectifier circuit for picking up variations in the radio-frequency signal caused by variations in the dielectric properties of the tire, such as variations in power absorption or capacitance, and transmitting corresponding variations in D. C. potential to a recorder.

Referring to the drawings:

Fig. 2 is a vertical sectional view of the novel machine with parts in elevation;

Fig. 3 is an enlarged fragmentary view as on line 3—3, Fig. 1;

Fig. 4 is an enlarged fragmentary sectional view on line 4—4, Fig. 1, and

Figure 1:
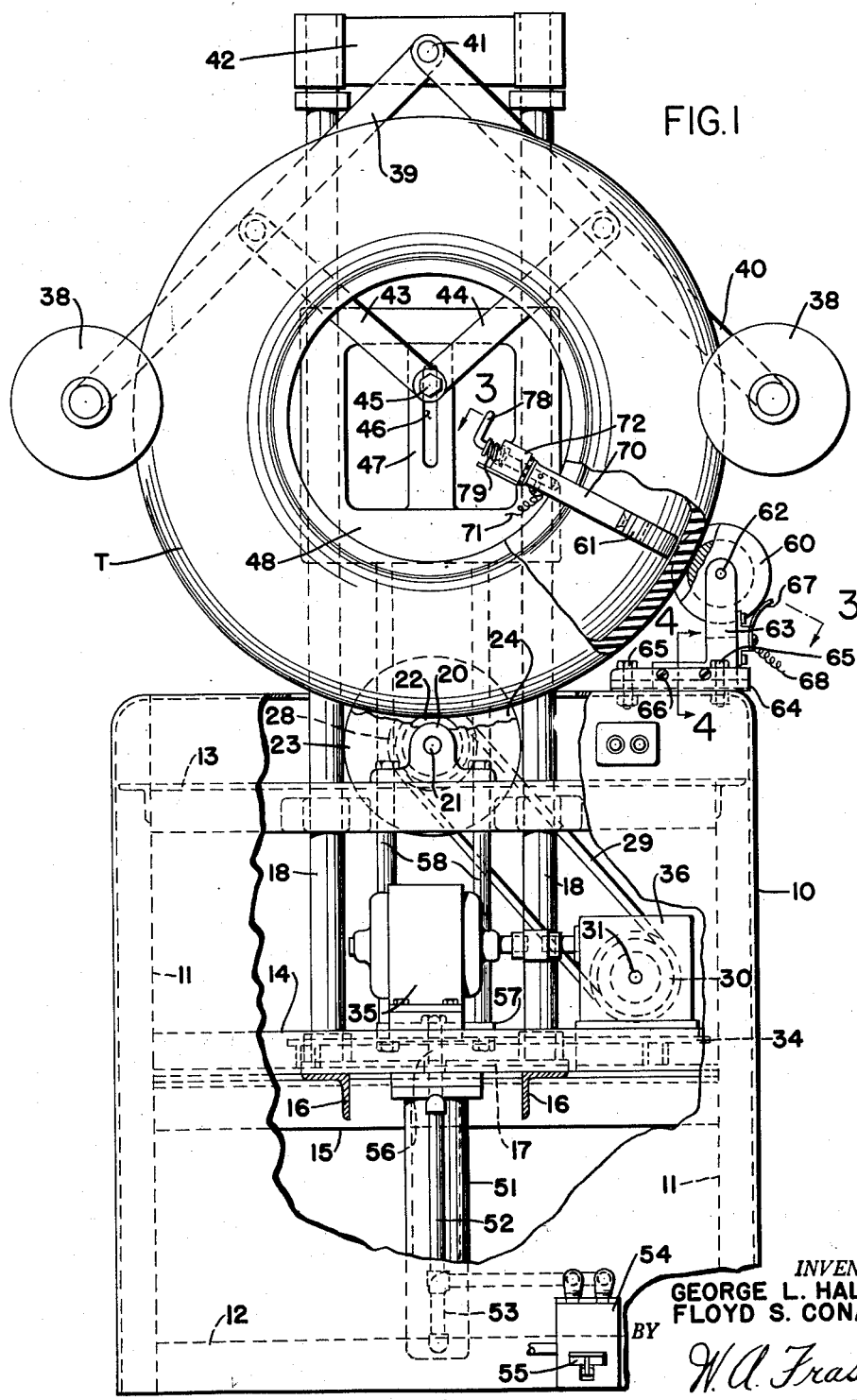
Fig. 1 is a front elevation with parts broken away of a novel machine embodying a preferred embodiment of the apparatus of the invention.

The novel apparatus preferably includes a base having a housing 10 enclosing the tire rotating and supporting mechanism. Within the housing is a framework consisting of vertical angles 11 connected by horizontal base angles 12, top angles 13, and intermediate horizontal angles 14 and 15 extending across the front and back of the housing. A pair of horizontal angles 16 extends from front to back between the angles 14 and 15 and supports the bottom plate 17 carrying the vertical guide rods 18 which extend above the housing in back of the tire T.

Bearings 20 carried on the top angles 13 at the laterally central portions thereof journal a central supporting shaft 21 extending from front to back of the housing between the guide rods 18. The shaft 21 carries a roller 22 on which the tread of the tire T is supported, and beveled guide rollers 23 and 24 are mounted on the shaft for engaging the sides of the tread to center it on the roller 22. The guide roller 23 may be adjustable on shaft 21 by means of an adjusting nut 25 and roller 24 may be yieldingly held in adjusted position by a coil spring 26 backed up by a bushing 27.

A pulley 28 is mounted on the rear end of shaft 21, and is driven by a belt 29 from drive pulley 30 mounted on a drive shaft 31. The shaft 31 is journaled in bearings 32 and 33 supported on a platform 34 which is mounted on the intermediate horizontal frame angles 15 and 16. Shaft 31 is driven by an electric motor 35 through a reducing gear box 36, both of which are mounted on the platform 34. Thus, the roller 22 can be rotated at a relatively low speed to rotate the tire casing T around its axis.

A pair of upper guide rollers 38, engaging opposite sides of the tire tread, is mounted at the upper ends of the guide rods 18. Preferably the rollers are V-shaped and are journaled on the lower ends of toggle arms 39 and 40, the upper ends of which are pivoted on a pin 41 secured in the cross head 42 connecting the upper ends of guide rods 18. The toggle arms are pivotally connected between their ends by toggle links 43 and 44 to a central bolt 45, which is slidable vertically in a slot 46 in a bar 47, and the bar 47 is part of a rectangular slide frame 48 slidable on the guide rods 18.

The means for sliding the frame 48 up and down on the guide rods preferably comprises a piston 50 reciprocable in a cylinder 51 carried on the plate 17 and actuated by a pressure fluid such as air in a well known manner. The ends of the cylinder 51 may be connected by conduits 52 and 53 to a control box 54 having a pedal 55 for operating the piston. The piston rod 56 is connected to a cross bar 57 to which the bottom ends of thrust rods 58 are connected, and the upper ends of the rods are connected to the bottom of slide frame 48.

The slot 46 in the slide frame provides a floating mounting for the bolt 45, so that the rollers 38 can adjust themselves by gravity into engagement with the thread of a variety of sizes of tires. When the piston 50 is raised through its full stroke, the bottom of slot 46 engages and raises bolt 45 which spreads the toggle arms 39 and 40 apart to allow removal and replacement of the tire T.

A concave roller 60 engaging the outer tread surface of the tire comprises one electrode of a tuning condenser and a semi-circular plate 61 positioned within the tire and closely adjacent to the inner tread surface is the other electrode, the tread wall being the dielectric between electrodes. The roller is journaled on a shaft 62 mounted in a supporting bracket 63 preferably of plastic or other insulating material. The bracket may be T-shaped in cross section, as shown in Fig. 4, and the bracket may be slidably mounted in a slotted plate 64 secured by bolts 65 to the top of the housing 10 at one side thereof. Thus, the bracket 63 may be adjusted to move the roller toward or away from the tire T to position it for different sizes of tires. The bracket 63 may be held in adjusted position by suitable means such as set screws 66. A spring contact 67 bearing on one edge of roller 60 is electrically connected to one side of a radio frequency oscillator circuit by a conductor 68.

The electrode 61 may be detachably secured by screw 69 to a conductor rod 70 which is electrically connected to the ground side of the oscillator circuit as by a conductor 71. The rod is mounted in a bracket 72 of plastic or insulating material, and the bracket is adjustably mounted on the frame 48 for movement in two directions so that the plate 61 can be positioned closely adjacent to but not touching the inner tread surface of the tire. A clearance of about 2 millimeters has been found to give satisfactory results but this may be varied as desired. For tires of substantially different diameters plates of different diameters can be substituted for plate 61.

The bracket 72 is preferably mounted for two-way adjustment by means of a plate 73 slidably mounted in a slot 74 in an ear 75 on the frame, the plate having slots 76 receiving the mounting bolts 77 and allowing adjustment in a transverse direction. The rod 70 is rotatable in bracket 72 to facilitate insertion of the plate 61 into the tire and withdrawal therefrom. A reduced portion of the rod extends through the bracket and has a handle 78 on its outer end. A spring 79 interposed between the bracket and a washer on the reduced portion of the rod normally holds a lug 80 on the handle into locking engagement with a notched flange on the bracket, for maintaining the plate 61 in position transversely of the tire. By pushing inwardly on the handle to disengage the lug 80, the plate 61 may be rotated through 90° in position to permit removing the tire from the apparatus, or removing the plate from the tire when bolts 76 and 77 are removed from the bracket 72.

Figure 5:
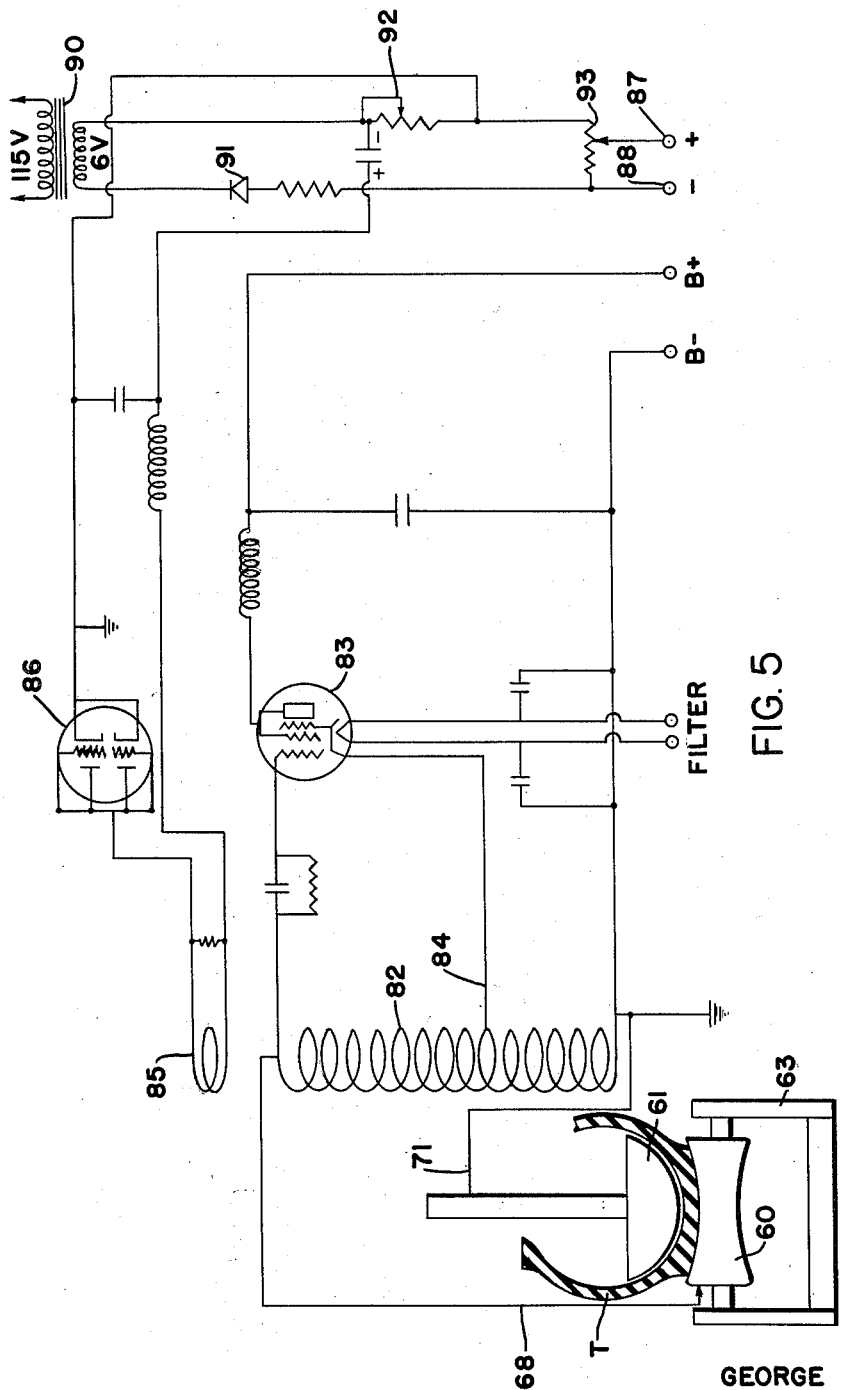
Fig. 5 is a wiring diagram of the electronic circuits for measuring variations or irregularities in the dielectric properties of the tire being tested.

Referring to Fig. 5, the tire T and the electrodes 60 and 61 are shown schematically. Conductor 68 electrically connects electrode 60 to one end of a tank coil 82. Conductor 71 connects electrode 61 to the other end of coil 82 and to ground. The tank coil is part of a substantially conventional radio-frequency oscillator circuit including a vacuum tube oscillator 83 which has a tap connection 84 with an intermediate portion of the coil 82. A regulated power supply for the oscillator is indicated at B plus and B minus, and the circuit is provided with suitable condensers and resistances as indicated by the symbols. Thus the two electrodes with the tire between constitute a capacitor or tuning condenser in the resonant circuit of the oscillator.

The tire section between the electrodes will absorb radio-frequency power, in the form of heat loss in a dielectric similar in effect to the introduction of a resistor into a tuned circuit. This loss results in reducing the difference in radio-frequency potential across the tuned circuit. Now as the tire is rotated between the electrodes, the amount and nature of the material in the tire will determine the amount of power absorbed, and variations in the thickness or mass and nature or quality of the material will cause variations in radio-frequency potential across coil 82. These variations induce a varying radio-frequency potential in a loop 85 which is part of a rectifier circuit including a rectifier tube 86.

The rectifier tube is connected in circuit with suitable condensers and resistances to the input terminals 87 and 88 of a suitable recording instrument such as a strip chart recorder, whereby a rectified and filtered D. C. or direct current potential is applied to the instrument. A bias voltage is supplied from a transformer 90, which is rectified and filtered by a rectifier 91 and a suitable resistance and condenser. As shown the filtered D. C. potential from this circuit is opposed to the filtered D. C. signal potential derived from the loop 85. The result is that most of the constant part of the signal potential is nullified, which leaves only the variations in the signal potential to be recorded. The variable resistance 92 provides centering for the recorder, and the variable resistance 93 provides amplitude control.

Accordingly, the present invention provides for the rapid and accurate testing of pneumatic tires for irregularities in mass, thickness, and quality without physically distorting or injuring the tires in any way. The novel apparatus is simple and inexpensive to build, and provides a means for testing each tire in a production run. During one revolution of a tire the recorder instrument makes a visual record of the relative uniformity of the complete tread portion of the tire and all irregularities can be quickly located by correlating the chart record with the circumference of the tire.

In testing production runs, the high and low limits on the chart can be predetermined, and any tire which records values above or below those limits may be rejected as not meeting the required standards. All the tires meeting the requirements will more nearly approach static and dynamic balance, and tire thump and uneven wear due to irregularities will be substantially reduced.

What is claimed is:

1. Apparatus for testing uniformity of material in a pneumatic tire casing, including roller means supporting the casing by engagement with the tread outer surface thereof, means for driving said roller means to rotate said casing about its axis, a roller electrode contacting the tread outer surface, a fixed electrode closely adjacent to the tread inner surface opposite the roller electrode and positioned at a predetermined distance therefrom, conductor means connecting said electrodes in a radio-frequency oscillator circuit, a rectifier circuit for picking up variations in the radio-frequency signal caused by variations in dielectric properties of the tire and converting them to variations in direct current potential, and a recording instrument for recording said direct current potential variations.

2. Apparatus for testing uniformity of material in a pneumatic tire casing, including roller means supporting the casing by engagement with the tread outer surface thereof, means for driving said roller means to rotate said casing about its axis, a roller electrode contacting the tread outer surface, a fixed electrode closely adjacent to the tread inner surface opposite the roller electrode and positioned at a predetermined distance therefrom, conductor means connecting said electrodes in a radio-frequency oscillator circuit, and means for measuring variations in radio-frequency potential caused by variations in the radio-frequency power absorbed in the tire due to irregularities in its mass and nature.

3. Apparatus for testing uniformity of material in a pneumatic tire casing, including roller means supporting the casing by engagement with the tread outer surface thereof, means for driving said roller means to rotate said casing about its axis, a roller electrode contacting the tread outer surface, a fixed electrode closely adjacent to the tread inner surface opposite the roller electrode and positioned at a predetermined distance therefrom, conductor means connecting said electrodes in a radio-frequency oscillator circuit, and means for measuring and recording variations in radio-frequency potential in said circuit in response to variations in the radio-frequency power absorption of the tire.

4. Apparatus for testing uniformity of material in a pneumatic tire, including roller means supporting the tire by engagement with the tread outer surface thereof, means for driving said roller means to rotate said tire about its axis, a roller electrode contacting the tread outer surface, a fixed electrode within the casing opposite said roller electrode and spaced from the tread inner surface at a predetermined distance from said roller electrode, means adjustably mounting said roller electrode for movement toward and away from said casing, a frame, means mounting said fixed electrode on said frame for adjustment relative to said tire, a radio-frequency circuit electrically connected to said electrodes, and means for measuring and recording variations in radio-frequency potential in said circuit in response to variations in the power absorption in the tire.

5. Apparatus for testing uniformity of material in a pneumatic tire, including roller means supporting the tire by engagement with the tread outer surface thereof, means for driving said roller means to rotate said tire about its axis, a roller electrode contacting the tread outer surface, a fixed electrode within the casing opposite said roller electrode and spaced from the tread inner surface, means adjustably mounting said roller electrode for movement toward and away from said casing, a frame, a slide movable on the frame, toggle arms on the frame operatively connected to the slide, guide rollers mounted on said toggle arms for engaging the tire at opposite positions, means adjustably mounting said fixed electrode on said slide, a radio-frequency circuit electrically connected to said electrodes, and means for measuring and recording variations in radio-frequency potential in said circuit in response to variations in the power absorption in the tire.

6. Apparatus for testing uniformity of material in a pneumatic tire, including roller means supporting the tire by engagement with the tread outer surface thereof, means for driving said roller means to rotate said tire about its axis, a roller electrode contacting the tread outer surface, a fixed electrode within the casing opposite said roller electrode and spaced from the tread inner surface, means adjustably mounting said roller electrode for movement toward and away from said casing, a frame, a slide movable vertically on the frame, means for raising the slide, toggle arms pivoted on the frame and having a lost motion connection with the slide, guide rollers carried by said toggle arms for engaging the tire at opposite points, means adjustably mounting said fixed electrode on said slide, a radio-frequency circuit electrically connected to said electrodes, and means for measuring and recording variations in radio-frequency potential in said circuit in response to variations in the power absorption in the tire.

References Cited in the file of this patent

UNITED STATES PATENTS

| | | |
|---|---|---|
| 1,779,907 | Dye | Oct. 28, 1930 |
| 1,878,109 | Clark | Sept. 20, 1932 |
| 1,976,904 | Terman | Oct. 16, 1934 |
| 2,177,528 | Kidd | Oct. 24, 1939 |
| 2,301,251 | Capen | Nov. 10, 1942 |
| 2,432,390 | Darby | Dec. 9, 1947 |
| 2,503,992 | Becker | Apr. 10, 1950 |
| 2,744,238 | Andersen | May 1, 1956 |

UNITED STATES PATENT OFFICE
CERTIFICATE OF CORRECTION

Patent No. 2,849,675                                  August 26, 1958

George L. Hall et al.

It is hereby certified that error appears in the printed specification of the above numbered patent requiring correction and that the said Letters Patent should read as corrected below.

Column 1, line 67, for "comprehensd" read -- comprehended --; column 3, line 3, for "thread" read -- tread --.

Signed and sealed this 27th day of January 1959.

(SEAL)

Attest:

KARL H. AXLINE                                ROBERT C. WATSON

Attesting Officer                               Commissioner of Patents